Dec. 25, 1951     W. C. WELTMAN ET AL     2,579,637
PHENOLIC RESIN COMPOSITION AND PRODUCTS PRODUCED THEREFROM
Filed Oct. 29, 1949
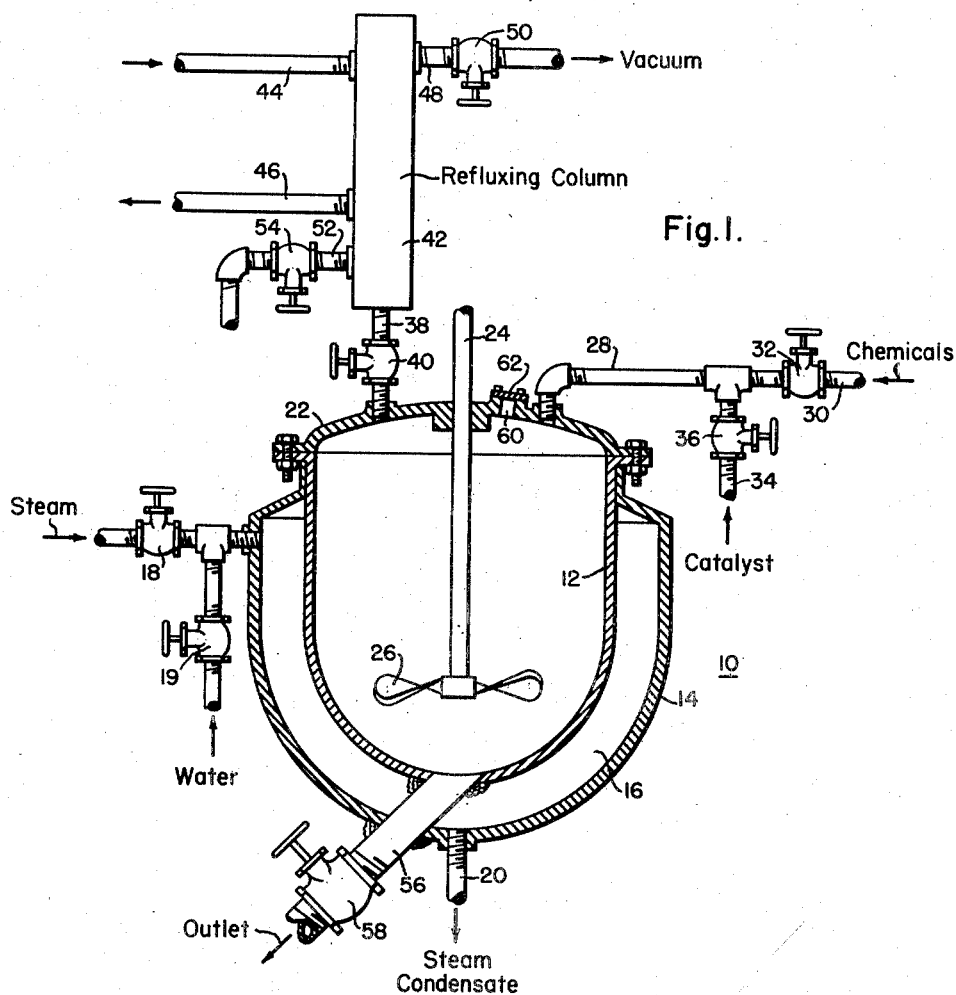
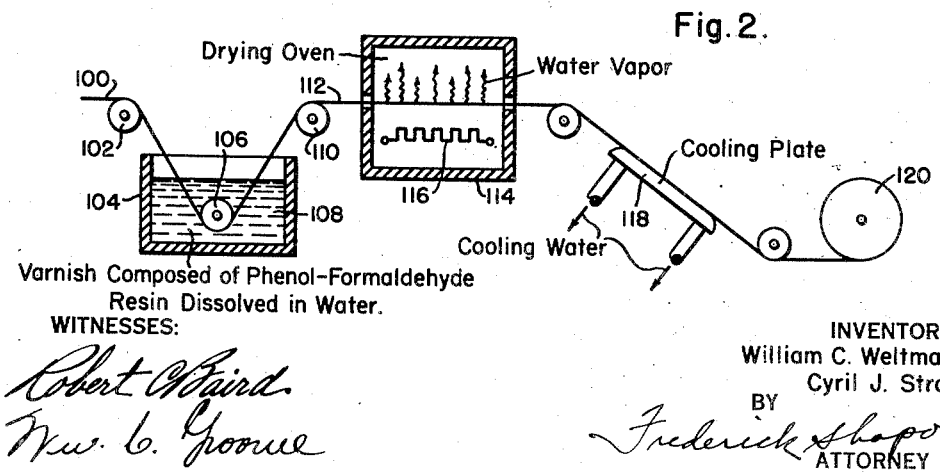
INVENTORS
William C. Weltman &
Cyril J. Straka.

Patented Dec. 25, 1951

2,579,637

UNITED STATES PATENT OFFICE 2,579,637

PHENOLIC RESIN COMPOSITION AND PRODUCTS PRODUCED THEREFROM

William C. Weltman and Cyril J. Straka, Pittsburgh, Pa., assignors to Westinghouse Electric Corporation, East Pittsburgh, Pa., a corporation of Pennsylvania Application October 29, 1949, Serial No. 124,412

6 Claims. (Cl. 260—29.3)

This invention relates to phenolic resins and more particularly to aqueous solutions of phenolic resins, the processes of producing them, and the products derived therefrom.

In the manufacture of phenolic resins, a widely used process comprises reacting a phenol with formaldehyde or other aldehyde to a low resinous polymer designated as the A stage, which is solvent soluble and potentially reactive. The A-stage resin is ordinarily dissolved in an organic solvent in order to produce a varnish that may be applied to members conveniently. After applying the varnish to members, the organic solvent is evaporated and ordinarily is completely lost or recovered only partially. The organic solvent constitutes a fire hazard, and other disadvantages are attendant upon its use.

It has been proposed to employ an aqueous medium for dissolving the A-stage phenolic varnishes. One previous suggestion is the use of strong caustic solutions, however, the strong caustic solution when applied to members will result in deterioration of many members and the caustic will produce other undesirable effects. Such caustic solutions are dangerous to the personnel handling them. Furthermore, the caustic must be neutralized at considerable expense. For all practical purposes, such caustic solutions are unsatisfactory and are not employed commercially.

In the Patent No. 1,799,816, it is suggested that phenol be reacted with formaldehyde for a brief period of approximately 30 to 40 minutes of boiling whereby a preliminary reaction product of very low viscosity with water solubility is effected. However, the product of this patent is not a true resin, the patent so stating and our investigations also reveal that the product is essentially a phenyl alcohol and not a resinous polymer. Such non-resinous solutions, however, are not satisfactory for commercial operations. One disadvantage is the extreme volatility of the preliminary phenol-formaldehyde reaction product. As much as 20% and more of the phenol-formaldehyde compound evaporates in applying the solutions of this patent and drying them. Furthermore, the material is not in what is ordinarily considered to be the A stage so that in subsequent processing, it is necessary to heat treat the reaction products much longer than would be required with an A-stage phenolic resin. To the best of our knowledge, the process and solutions of Patent No. 1,799,816 are uneconomical commercially and are not employed.

The object of this invention is to provide a solution of an A-stage phenolic resin using water as the sole solvent.

A further object of the invention is to provide a process for producing an A-stage phenolic resin dissolved in water alone.

A still further object of the invention is to provide a process for impregnating cellulosic materials with an A-stage phenolic resin dissolved in water alone.

Other objects of the invention will in part be obvious and will in part appear hereinafter.

For a better understanding of the nature and objects of the invention, reference should be had to the following detailed description and drawing in which:

Figure 1 is a view in elevation, partly in section through a reaction vessel; and Figure 2 is a schematic showing partly in section of apparatus for varnish impregnating cellulosic materials.

We have discovered a method for producing aqueous solutions of true A-stage phenolic resins which have exceptional properties. The solutions are of suitable viscosity for use in varnish impregnating towers and are of a suitably low viscosity permitting application of the varnishes to paper, cloth and other materials in conventional equipment with satisfactory results. The aqueous varnishes have a high resin content and are stable for prolonged periods of time. Other advantages of these compositions will be set forth hereinafter.

We have found that only the reaction product of phenol (hydroxy benzene) and formaldehyde or a polymer of formaldehyde in the proportions of 1 mol of phenol to from 1 to 1.25 mols of the aldehyde reacted under certain critical conditions will produce water soluble A-stage phenolic resins. The phenol and aldehyde must be reacted by refluxing in the presence of from 0.2% to 5% by weight, based on the weight of the phenol, of an alkaline catalyst selected from the group consisting of alkali metal and alkaline-earth metal oxides and hydroxides and alkali metal carbonates. Examples of suitable catalysts are sodium hydroxide, sodium carbonate, calcium oxide, barium oxide, calcium hyroxide, strontium hydroxide, potassium carbonate and lithium hydroxide. The refluxing should be carried out in the presence of a refluxing liquid comprising substantial amounts of water or other volatile liquid boiling between 80° C. and 125° C., the liquid being substantially non-reactive. Examples of such liquids are butanol, aqueous ethanol, diethyl Cellosolve, propyl alcohol, aqueous propyl alcohol, sec-butyl acetate, propyl acetate and naphtha. Water is preferred because of its availability and reduced fire hazard. The use of aqueous formaldehyde will introduce sufficient water in the order of 50% of the weight of the reactants. The amount of water may be as little as 10% to 15% of the weight of the reactants and at the other extreme may be equal to 5 times the weight of the reactants. The mixture of phenol and aldehyde is refluxed for a period of from ½ hour to 2 hours in water as the refluxing liquid, the longer time being employed with the smaller amounts of catalyst and the shorter period of time with the larger amounts of the catalyst. The reflux time also is inversely proportional to the reflux temperature. With an 80° C. reflux temperature, the time may be as much as 4 hours, while with a 125° C. reflux temperature, the time may be slightly less than ½ hour. The refluxing is preferably continued until the viscosity of a 50% water solution is above 50 centipoises and preferably carried out until the phenolic resin begins to separate from the water. By contrast the reaction in Patent 1,799,816 is carried out by boiling for a time of from 30 to 40 minutes, without approaching a water separation stage, and the viscosity of the aqueous solution of such products was between 12 and 25 centipoises.

After refluxing to the desired viscosity or until a separation of the resin takes place, we cause a greater degree of polymerization of the phenol and aldehyde to take place by dehydrating the reflux product under a vacuum of from 15 to 28 inches of mercury and to a temperature of from 60° C. to 125° C. until a substantially water-free phenolic resin of a viscosity of from 1,000 to 12,000 centipoises at a test temperature of 25° C. is produced. The resinification of the phenol and aldehyde is greatly advanced during the dehydration so that it results in a relatively thick resinous body constituting an A-stage phenolic resin which becomes water soluble in this range of viscosities. During dehydration water produced during condensation is removed along with the refluxing liquid. Finally, to produce an aqueous solution there is added to the dehydration product from 15 to 25 parts of water to each 85 to 75 parts by weight of the resin. Simple stirring of the resin and water will produce a stable, low viscosity phenolic resin solution, hereinafter designated as a varnish, suitable for conventional applications. Any phenol other than hydroxy benezene will not produce the water soluble A-stage resin.

Referring to Figure 1 of the drawing, there is illustrated a typical reaction vessel 10 that may be employed for producing the phenolic resin of this invention soluble in water. The reaction vessel 10 comprises a chamber 12 in which the reaction is carried out with an outer jacket 14 providing a space 16 for the admission of steam or cold water by operating a valve 18 or 19 as required. Condensate or water may be withdrawn from the jacket through the pipe 20. The reaction vessel is provided with a cover 22 through which passes a shaft 24 operating a stirrer 26 disposed in the chamber 12. To the cover there is attached a conduit 28 to which chemicals, such as aqueous formaldehyde and hot melted phenol, may be admitted from a pipe 30 controlled by a valve 32. A second pipe 34 connected to the conduit 28 enables the introduction of the catalyst such as a strong solution of sodium hydroxide in accordance with the operation of a valve 36. Also affixed to the cover is a conduit 38 controlled by a valve 40 leading to a reflux column 42 which is provided with a flow of cooling water introduced from an inlet 44, and withdrawn through an outlet 46. The reflux column is also provided with a conduit 48 fitted with a valve 50 leading to a suitable source of vacuum for applying a vacuum in order to evacuate the volatiles from the vessel. After the reaction is completed, the resin may be withdrawn through a dump pipe 56 controlled with a valve 58. Water and similar volatiles condensed in the column 42 may be returned to the vessel 12 or permitted to escape to the exterior of the vessel system by opening a valve 54 in a water vent line 52. Solids, such as paraformaldehyde, may be introduced into the vessel through a port 60 provided with a removable cover 62.

In preparing the resin of the present invention, phenol and formaldehyde in the proportions of from 1 to 1.25 mols of formaldehyde per mol of phenol is introduced into the chamber 12. Aqueous formaldehyde containing 37% to 40% formaldehyde is a convenient source of the formaldehyde though paraformaldehyde alone or admixed with aqueous formaldehyde may be employed. If paraformaldehyde alone is used, it is desirable to introduce an amount of water, or other volatile liquid boiling between 80° C. and 125° C., equal to at least 10% of the weight of the phenol and the paraformaldehyde. A weighed amount of the phenol may be introduced into the vessel through the port 60, and then the aqueous formaldehyde admitted through the conduit 30. Thereafter, the alkaline catalyst, in solution or in suspension, is admitted through the pipe 34 or solid catalyst in powdered form added through port 60, in an amount of from 0.2% to 5% of the weight of the phenol. Steam is admitted to the space 16 to bring the reactants to refluxing temperature while the stirrer 26 is in operation. Refluxing is continued ordinarily for at least 1 hour, though with the larger amounts of the catalyst, that is from 3% to 5%, a little over one-half hour may be adequate. The reflux column 42 will return the water produced during refluxing into the vessel. After the viscosity of a 50% solution of the reaction product exceeds 50 centipoises, refluxing may be terminated, though we prefer to continue the refluxing until a definite separation of the water from the resin takes place. Thereafter, the vacuum line 48 is connected to the reflux column to dehydrate the reaction product. A vacuum of from 15 to 28 inches of mercury may be employed. The temperature of the resin will drop at first and then rise to a temperature of from between 80° C. to 125° C., and the resin will become quite viscous. A viscosity of from 1,000 to 12,000 centipoises of the substantially water-free phenolic resin is required. Dehydration may then be stopped and cold water introduced into the space 16 of the reaction vessel. At the same time or soon thereafter, the water required to produce a varnish solution is introduced in an amount of from 15 to 15 parts for each 85 to 75 parts by weight of the hot resin. It is not necessary that the resin be admixed with the water in the reaction vessel, though this is advantageous. The resin may be withdrawn through the dump pipe 52 into a separate mixing tank or the like in which it can be admixed while hot with the required amount of water. The varnish produced by admixing this amount of water will have a viscosity of from about 100 centipoises to 400 centipoises at a temperature of 25° C. The varnishes so produced are stable and behave much as do varnishes produced with organic solvents such as toluene or benzene.

We have used ordinary tap water as well as distilled water in producing satisfactory varnish solutions. By "water" we intend to designate not only distilled water but water containing small amounts of salts, dissolved organics and the like which do not impair the varnish.

The varnishes produced are suitable for all applications which are satisfied by varnishes based on an organic solvent. For some applications, however, the varnishes of the present invention are highly superior to organic solvent base phenolic varnishes. Thus, in treating cellulosic material, such as paper, a single dip in the varnish of the present invention will apply up to 250% of resin based on the weight of the paper, while organic solvent base varnishes ordinarily require 2 or more passes through the varnish to secure an equivalent application of the phenolic resin on the paper. Further, the resin applied from the aqueous solutions of the present invention is more uniformly distributed within the entire structure of the paper or cellulosic material, whereas most phenolic varnishes employing an organic solvent only partially impregnate the body of the paper and leave substantially amounts of resin on the surface.

Referring to Figure 2 of the drawing, there is illustrated apparatus for impregnating cellulosic materials and the like with the aqueous varnish of the present invention. A sheet 100 of cellulosic material, such as paper, cotton cloth or the like (though it is to be understood that other fibrous or sheet materials besides cellulosic materials may be similarly treated), is passed over roll 102 and down into a varnish tank 104 under a roll 106 immersed in varnish 108 composed of the phenolformaldehyde resin dissolved in water as described herein. After passing through the varnish, the paper with a coating of the varnish thereon passes over the roll 110 and thence into an oven 114 where the treated paper designated as 112 is dried. The water in the varnish evaporates under the influence of heat imparted by the heating elements 116 leaving a quantity of B-stage phenolic resin distributed in the sheet. Thereafter, the sheet is passed over a cool plate 118 if necessary to cool the impregnated paper and prevent any undesirable further reaction of the resin. Thereafter, the impregnated paper may be rolled into a roll 120 for storage and subsequent use.

The aqueous varnish solutions of the present invention have a very high resin solids content. We have secured from 60% to 70% by weight of recoverable solids from the varnish of the present invention, whereas among the best phenolic varnishes made with an organic solvent, the solids content does not exceed approximately 49% to 55%.

The varnish after being applied to a base material such as paper and dried leaves a resin which is moldable under conventional times and pressures. However, the molded members may be taken out of a press without cooling, whereas most conventional phenolic resin moldings must be cooled in the press. The molding procedure accordingly is greatly reduced by the use of the resins in the present invention.

The following table indicates the time required to react 600 parts by weight of phenol with 600 parts by weight of 37% formaldehyde with the indicated amounts of catalyst:

Table

| Varnish # | KOH | Reflux Time, Min. | Viscosity | Remarks |
|---|---|---|---|---|
| | Per cent | | Centipoises | |
| A | ½ | 30 | 12 | |
| B | ½ | 60 | 15 | |
| C | ½ | 90 | 36 | |
| D | ½ | 120 | 251 | Water separated. |
| E | 1 | 30 | 12 | |
| F | 1 | 60 | 21 | |
| G | 1 | 90 | 38 | |
| H | 1 | 120 | 213 | Water separated. |
| I | 1½ | 30 | 15 | |
| J | 1½ | 60 | 36 | |
| K | 1½ | 90 | | Water separated. |
| L | 3 | 30 | 25 | |
| M | 3 | 60 | 66 | |
| N | 3 | 90 | | Water separated. |

The stage of reaction at D, H, K, M and N alone is suitable for the purpose of this invention. The compositions D, H, K and N were subjected to vacuum dehydration until the composition was an A-stage resin of a viscosity of from 1,000 to 12,000 centipoises. Thereafter, the resin in each case was admixed while hot with from 15 to 25 parts of water for each 85 to 75 parts of the resin and a satisfactory phenolic resin-water solvent varnish resulted.

Since certain obvious changes may be made in the above procedure and different embodiments of the invention could be made without departing from the scope thereof, it is intended that all matter contained in the above description shall be interpreted as illustrative and not in a limiting sense.

We claim as our invention:

1. A relatively stable phenolic varnish composition comprising a solution of from 15 to 25 parts by weight of water and from 85 to 75 parts by weight of a potentially reactive, thermosettable, phenol-aldehyde resin, the varnish derived by refluxing in the presence of water one mol of phenol, from 1 to 1.25 mols of an aldehyde selected from the group consisting of formaldehyde and reactive polymers of formaldehyde, and from 0.2% to 5% by weight, based on the weight of the phenol, of an alkaline catalyst selected from the group consisting of alkali metal and alkaline-earth metal oxides and hydroxides and alkali metal carbonates, the water being equal to at least 10% of the weight of the reactants and not exceeding five times the weight of the reactants, the refluxing being carried out for from ½ to 2 hours until the viscosity of a 50% water solution is above 50 centipoises, then dehydrating the reflux product under a vacuum of from 15 to 28 inches of mercury and a temperature of from 80° C. to 125° C. until a substantially water-free phenolic resin of a viscosity of from 1,000 to 12,000 centipoises is produced, and finally adding only from 15 to 25 parts of water to each 85 to 75 parts by weight of the resin to produce the solution.

2. A relatively stable phenolic varnish composition comprising a solution of from 15 to 25 parts by weight of water and from 85 to 75 parts by weight of a potentially reactive, thermosettable, phenol-aldehyde resin, the varnish derived by refluxing in an aqueous medium one mol of phenol, from 1 to 1.25 mols of an aldehyde selected from the group consisting of formaldehyde and reactive polymers of formaldehyde, and from 0.2% to 5% by weight, based on the weight of the phenol, of an alkaline catalyst selected from the group consisting of alkali metal and alkaline-earth metal oxides and hydroxides and alkali metal carbonates, the aqueous medium equal to at least 10% and not exceeding five times the weight of the reactants, the refluxing being carried out for from ½ to 2 hours until water separates from the phenolic reaction product, then dehydrating the reflux product under a vacuum of from 15 to 28 inches of mercury and a temperature of from 80° C. to 125° C. until a substantially water-free phenolic resin of a viscosity of from 1,000 to 12,000 centipoises is produced, and finally adding only from 15 to 25 parts of water to each 85 to 75 parts by weight of the resin to produce the solution.

3. In the process of producing a phenolic resin impregnated cellulosic sheet, the steps comprising passing the cellulosic sheet only once through a phenolic varnish comprising a solution of from 15 to 25 parts by weight of water and from 85 to 75 parts by weight of a potentially reactive, thermosettable, phenol-aldehyde resin, the varnish derived by refluxing in a refluxing medium having a boiling point of 80° C. to 125° C., one mol of phenol, from 1 to 1.25 mols of an aldehyde selected from the group consisting of formaldehyde and reactive polymers of formaldehyde, and from 0.2% to 5% by weight, based on the weight of the phenol, of an alkaline catalyst selected from the group consisting of alkali metal and alkaline-earth metal oxides and hydroxides and alkali metal carbonates, the refluxing medium being equal to at least 10% and not exceeding five times the weight of the reactants, the refluxing being carried out for from ½ to 2 hours until the viscosity of a 50% water solution is above 50 centipoises, then dehydrating the reflux product under a vacuum of from 15 to 28 inches of mercury and a temperature of from 80° C. to 125° C. until a substantially water-free phenolic resin of a viscosity of from 1,000 to 12,000 centipoises is produced, finally adding only from 15 to 25 parts of water to each 85 to 75 parts by weight of the resin to produce the solution, and drying the treated cellulosic sheet under heat to drive off the water, thereby leaving a large amount of phenolic resin impregnant in the sheet in an amount of about 250% of the weight of the cellulosic sheet.

4. In the process of producing an aqueous solution of partially reacted, potentially reactive, phenol-aldehyde resin, the steps comprising refluxing in an aqueous medium one mol of phenol, from 1 to 1.25 mols of an aldehyde selected from the group consisting of formaldehyde and reactive polymers of formaldehyde, and from 0.2% to 5% by weight, based on the weight of the phenol, of an alkaline catalyst selected from the group consisting of alkali metal and alkaline-earth metal oxides and hydroxides and alkali metal carbonates, the aqueous medium equal to at least 10% and not exceeding five times the weight of the reactants, the refluxing being carried out for from ½ to 2 hours until the viscosity of a 50% water solution is above 50 centipoises, then dehydrating the reflux product under a vacuum of from 15 to 28 inches of mercury and a temperature of from 80° C. to 125° C. until a substantially water-free phenolic resin of a viscosity of from 1,000 to 12,000 centipoises is produced, and finally adding only from 15 to 25 parts of water to each 85 to 75 parts by weight of the resin to produce the solution.

5. In the process of producing an aqueous solution of partially reacted, potentially reactive, phenol-aldehyde resin, the steps comprising refluxing in an aqueous medium one mol of phenol, from 1 to 1.25 mols of an aldehyde selected from the group consisting of formaldehyde and reactive polymers of formaldehyde, and from 0.2% to 5% by weight, based on the weight of the phenol, of an alkaline catalyst selected from the group consisting of alkali metal and alkaline-earth metal oxides and hydroxides and alkali metal carbonates, the aqueous medium equal to at least 10% and not exceeding five times the weight of the reactants, the refluxing being carried out for from ½ to 2 hours until water separates from the phenolic reaction product, then dehydrating the reflux product under a vacuum of from 15 to 28 inches of mercury and a temperature of from 80° C. to 125° C. until a substantially water-free phenolic resin of a viscosity of from 1,000 to 12,000 centipoises is produced, and finally adding only from 15 to 25 parts of water to each 85 to 75 parts by weight of the resin to produce the solution.

6. A relatively stable phenolic varnish composition comprising a solution of from 15 to 25 parts by weight of water and from 85 to 75 parts by weight of a potentially reactive, thermosettable, phenol-aldehyde resin, the varnish derived by refluxing in the presence of a substantially non-reactive refluxing liquid boiling between 80° C. and 125° C. one mol of phenol, from 1 to 1.25 mols of an aldehyde selected from the group consisting of formaldehyde and reactive polymers of formaldehyde, and from 0.2% to 5% by weight, based on the weight of the phenol, of an alkaline catalyst selected from the group consisting of alkali metal and alkaline-earth metal oxides and hydroxides and alkali metal carbonates, the refluxing liquid constituting at least 10% of the reactants and not exceeding five times the weight of the reactants, the refluxing being carried out for from less than ½ to 4 hours until the viscosity of a 50% water solution is above 50 centipoises, then dehydrating the reflux product under a vacuum of from 15 to 28 inches of mercury and a temperature of from 80° C. to 125° C. until a substantially water-free phenolic resin of a viscosity of from 1,000 to 12,000 centipoises is produced, and finally adding only from 15 to 25 parts of water to each 85 to 75 parts by weight of the resin to produce the solution.

WILLIAM C. WELTMAN.
CYRIL J. STRAKA.

REFERENCES CITED

The following references are of record in the file of this patent:

UNITED STATES PATENTS

| Number | Name | Date |
| --- | --- | --- |
| 2,190,672 | Meharg | Feb. 20, 1940 |
| 2,229,357 | Wightman | Jan. 21, 1941 |
| 2,333,034 | Ogelsby | Oct. 26, 1943 |
| 2,482,525 | Wachter | Sept. 20, 1949 |